United States Patent Office 3,396,091
Patented Aug. 6, 1968

3,396,091
PROCESS OF FORMING ELECTROCATALYTIC SURFACES
Ernest H. Lyons, Jr., Marblehead, and Russell M. Dempsey, Hamilton, Mass., assignors to General Electric Company, a corporation of New York
No Drawing. Filed Mar. 18, 1965, Ser. No. 440,916
20 Claims. (Cl. 204—11)

The invention relates to a process of producing platinum metal electrodes of high electrocatalytic activity and structural integrity.

It has long been recognized that the high electrocatalytic activity of platinum metals together with their inertness to chemical corrosion render them the most suitable of all metals for electrode construction. Since the cost per unit weight of platinum metals exceeds that of gold, intensive research has been generated to develop electrodes and processes for their manufacture which maximize the electrocatalytic activity per unit weight of platinum metal employed. It has been recognized that catalysis by platinum metals is a surface phenomenon and that high electrocatalytic activity requires a high surface area per unit weight.

By employing platinum metals in finely divided particulate form, electrodes have been constructed having platinum metal surface areas which are high multiples of the area represented by the electrode dimensions. One of the outstanding disadvantages of fabricating electrodes from finely divided platinum metals, such as platinum metal blacks, for example, is the lack of structural integrity of the catalyst materials. In order to utilize a black as an electrode, it is generally necessary that it be united to a substrate. When it is attempted to unite the black using pressure alone, the result is consolidation of the black, returning it to a low surface area per unit weight metallic form. Successful electrode fabricating techniques have been developed employing platinum metal blacks in combination with inert binders and wet-proofing agents. Theoretically, the binder unites juxtaposed particles while leaving exposed at least a portion of each particle. Any excess binder may substantially encapsulate a large portion of the individual catalyst particles thereby curtailing the effectiveness per unit weight of platinum metal. On the other hand, in using too little binder the electrode becomes vulnerable to erosion of the platinum metal from the electrode. Further, both conditions may simultaneously occur in a single electrode.

In view of the disadvantages of fabricating electrodes from particulate platinum metals, numerous attempts have been made to form electrocatalytic electrodes exhibiting high surface area per unit weight while retaining the desirable metallic fabricating properties. Metal foil electrodes have been employed, but such electrodes are relatively impermeable by gases other than hydrogen and do not offer a catalyst surface substantially larger than the dimensions of the foil electrode. The electrodeposition of platinum metals on conductive substrates has resulted in electrodes of higher electrocatalytic activity per unit weight of platinum metal than obtainable with foils. Such electrodeposited catalysts, however, exhibit very low mechanical strength and lack sufficient adhesion to the substrate to withstand erosion in electrode use.

It is an object of the invention to provide a process of fabricating a platinum metal electrode of high electrocatalytic activity and structural integrity.

It is another object of the invention to provide a process of fabricating a platinum metal electrode of high surface area per unit weight.

These and other objects of our invention are accomplished by providing an aqueous plating bath containing a platinum metal, preferably in the form of a halide or sulfate salt, in a concentration of from 3 to 20, preferably 5 to 10, grams per liter (g./l.); concentrated hydrochloric acid in a proportion of from 0 to 100 milliliters per liter (ml./l.), preferably 20 to 60 ml./l.; a selected base metal halide or sulfate in an amount sufficient to form a weight ratio of platinum metal to selected base metal of no less than 1:1 and no more than 10:1, preferably 2:1 to 7.5:1; and a dissolved quantity of lithium sodium or alkaline earth metal halide sufficient to completely solubilize the selected base metal halide or sulfate. Plating is accomplished using a foraminous cathode structure and any conventional anode and with current densities of from 5 to 50 milliamperes per square centimeter (ma./cm.$^2$), preferably from 15 to 45 ma./cm.$^2$. Plating bath temperatures are maintained within the range of 30° C. to 80° C. Upon the deposition of a platinum metal-selected base metal alloy coating of the desired thickness on the foraminous cathode, the structure is removed from the bath and rinsed in a lithium, sodium, or alkaline earth metal halide solution and then water. Subsequently, the selected base metal is etched from the deposited alloy coating leaving an electrode of high surface area per unit weight of platinum metal and of high structural integrity.

The term "platinum metal" as herein employed includes Group VIII metals of the light and heavy platinum triads. These metals are ruthenium, rhodium, palladium, iridium, osmium, and platinum. The term "selected base metal" as herein employed refers to a group of metals consisting of nickel, copper, zinc, silver, and cadmium. The term "halide" as herein employed includes Group VII-A anions with the exception of fluorine. The included halides consist of chlorides, bromides, and iodides.

A preferred platinum metal compound for use in our plating bath is chloroplatinic acid. Other exemplary additives include palladium chloride as well as chlorides of ruthenium, rhodium, osmium, and iridium. Platinum metal halides may be employed individually or as mixtures in any proportion. Platinum metals may also be added to the bath in the form of sodium, lithium, or alkaline earth platinum metal halides such as, for example, sodium chloroplatinate, lithium chloroplatinate, alkaline earth chloroplatinates, etc. Other useful platinum metal additives include hydrated platinum metal oxides such as hydrated platinic oxide, for example.

The selected base metals are added to the plating bath in the form of selected base metal halides or sulfates. The selected base metal salts contemplated are nickel, copper, zinc, silver, and cadmium chlorides, bromides, iodides, and sulfates. The weight ratio of platinum metal to selected base metal is maintained within the range of 1:1 to 10:1 inclusive, preferably 2:1 to 7.5:1 inclusive. A preponderant weight of platinum metal in the plating bath and the resulting plate is required in order that the mechanical strength of the etched electrode remains high. A deficient quantity of platinum metal in the plate may result in structural weakening of the electrode during etching to a point where platinum metal cohesion may be insufficient to prevent erosion. On the other hand, failure to incorporate sufficient selected base metal in the plating bath results in an electrode of reduced surface area per unit weight of platinum metal.

The bath electrolyte is a lithium, sodium, or alkaline earth metal halide dissolved in a quantity sufficient to solubilize the selected base metal halide to the desired weight concentration. Lithium and sodium halides are generally preferred electrolytes because of their relatively higher solubilities. Lithium and sodium chlorides are most preferred electrolytes. Suitable alkaline earth metal halides include magnesium, calcium, strontium, and barium chlorides, bromides, and iodides. If desired, the bath may be saturated with the lithium, sodium, or alkaline earth metal halide.

Concentrated hydrochloric acid may be added to the plating bath as an optional electrolyte component. The hydrochloric acid is an excellent selected base metal halide solubilizing agent, however, it is preferred that its use be restricted to quantities below 100 ml./l. in order to avoid corrosion problems.

As is well recognized in the art the bath should be maintained free of contaminants which will adversely influence the plating process, as for example, strong oxidizing agents, strong reducing agents, undesirable base metals which may co-deposit with the platinum metals. Potassium, ammonium, cesium, rubidium, etc., ions should be substantially absent from the bath because of the well-known tendency of these materials to cause the precipitation of platinum metals as complex platinum metal halides or sulfates thereof. Impurities of the type normally associated with commercial grades of platinum metals are not, however, considered objectionable to the practice of the invention.

Any electrically conductive material chemically inert to the plating bath may be used as an electrode substrate for receiving cathodic deposition of the platinum metal-selected base metal alloy during electroplating. In creating fuel cell electrodes, it is generally preferred that the substrate be of a foraminous character. The substrate may take any of the conventional form such as an expanded or woven metal screen, a mat, etc. Substrate material of known suitability in fuel cell applications include tantalum, titanium, Nichrome, stainless steel, graphite, nickel, titanium-palladium alloys, etc. Under certain extremely rigorous operating conditions it may be desired to form electrode substrates from the precious metals such as gold, silver, osmium, platinum, palladium, etc., even though economic considerations normally preclude use of such substrates. It is appreciated that the substrate, in order to meet the requirement of electrical conductivity, need not be entirely formed of electrically conductive material. The substrate may be formed of a metal coated ceramic or glass or may be a cermet, for example.

The plating bath anode may take the form of any conventional inert conductor of electricity such as graphite, for example. Anodes consisting essentially of platinum metals may also be used. Alternately, it may be convenient to employ a platinum metal-selected base metal alloy anode corresponding to the composition of the alloy being deposited on the substrate so that the metal ions in the bath are automatically replenished. A suitable anode of this type is an unetched electrode formed by previous electrodeposition.

Bath plating is conducted at temperatures ranging from 30° C. to 100° C. and at cathode current densities of from 5 to 50 ma./cm.$^2$, preferably 15 to 45 ma./cm.$^2$. The current density is calculated on the basis of the immersed cathode surface area facing the anode, as is conventional practice. Plating may be continued for any duration necessary to build up a platinum metal-selected base metal deposit of the desired thickness. Unlike conventional platinum metal plating processes, our process may be employed to generate coatings in excess of 1 mil in thickness without encountering flaky, brittle or otherwise non-adherent coatings. Further, it is not necessary to resort to such ancillary manipulations as polishing, current reversals, etc., generally deemed necessary by the art of obtain adherent, thick platinum metal coatings.

Upon removal of the substrate from the plating bath with the cathodically deposited platinum metal-selected base metal coating thereon, it is desirable to rinse the unetched electrode with a lithium, sodium, or alkaline earth halide to remove any selected base metal halide which may be present on the surface. This prevents precipitation of the selected base metal halide on the surface of the unetched electrode during subsequent contact with aqueous solutions. The unetched electrode is then rinsed with water.

The selected base metal is removed from the unetched electrode by treatment with an etchant which is reactive toward the selected base metal but inert toward the platinum metal. In selectively etching base metals from base metal-heavy platinum triad metal alloys, nitric acid may be employed. Sodium peroxydisulfate solutions acidified with a mineral acid such as sulfuric acid, for example, may be employed with all platinum metals. Also, mixtures of hydrofluoric and nitric acid may be used as an etchant for platinum metals generally. Etching may be accomplished electrolytically, if desired, by anodizing a base-metal-platinum metal alloy in a sodium or ammonium cyanide bath. Any known selective etching treatment may be employed.

The resulting etched electrode consists of a platinum metal coating on an electrically conductive substrate. The platinum metal is honeycombed with passages and cavities of microscopic and atomic dimensions. The surface area per unit weight of platinum metal approaches that of a bonded particular platinum metal electrode yet the electrode offers superior structural integrity. The electrode is resistant to scaling, flaking, and other forms of platinum metal erosion.

The following examples are illustrative of the practice of our invention and are not for purposes of limitation.

Example 1

A plating bath was prepared consisting essentially of 500 g./l. lithium chloride, 40 ml./l. hydrochloric acid, 8 g./l. chloroplatinic acid, 2 g./l. silver chloride, and the remainder water. A cathode and an anode, each a bright platinum strip, were immersed in the bath, electrodeposition was conducted at a temperature of approximately 80° C. and a current density of 30 m./cm.$^2$ for a period of 8 minutes. The cathode was removed from the bath, and rinsed in lithium chloride to remove any silver ions remaining on the surface and then in water. Upon inspection, the cathode was noted to exhibit a smooth, adherent, semibright coating. The cathode was then immersed in a warm, concentrated nitric acid bath for 50 seconds. The cathode took on a deep black color and appeared to be fully etched at the end of 50 seconds. Upon removal from the etchant, the coating was found to be tenaciously adherent to the cathode.

Example 2

A plating procedure similar to that described in Example 1 was followed using a plating bath consisting essentially of 300 g./l. sodium iodide, 2.5 g./l. copper in the form of cuprous iodide, 7 g./l. platinum in the form of chloroplatinic acid, 30 ml./l. hydrochloric acid, and the remainder water. Plating was conducted at a current density of 20 ma./cm.$^2$ and a temperature of approximately 38° C. The final product after etching was a platinum cathode having a black, tenaciously adherent coating.

Example 3

A plating procedure similar to that described in Example 1 was followed using a plate bath consisting essentially of 300 g./l. sodium bromide, 2.5 g./l. copper as cuprous bromide, 7 g./l. platinum as chloroplatinic acid, 30 ml./l. hydrochloric acid, and the remainder water. Plating was conducted at a current density of 20 ma./cm.$^2$ and a temperature of approximately 38° C. The final product was a platinum cathode having a black, tenaciously adherent coating.

Example 4

A plating procedure similar to that described in Example 1 was followed using a plating bath consisting essentially of 250 g./l. magnesium chloride, 2.5 g./l. silver and silver chloride, 7 g./l. platinum as chloroplatinic acid, 50 ml./l. hydrochloric acid, and the remainder water.

Plating was conducted at a current density of 15 ma./cm.$^2$ and a temperature of approximately 38° C. The final product was a platinum cathode having a black, tenaciously adherent coating.

Example 5

A plating procedure similar to that described in Example 1 was followed using a plating bath consisting essentially of 250 g./l. magnesium chloride, 15 g./l. nickel sulfate, 8 g./l. palladium chloride, and the remainder water. Plating was conducted at a current density of 15 ma./cm.$^2$ and a temperature of approximately 77° C. An etchant was prepared by mixing 25 cc. of 48 percent hydrofluoric acid with 25 cc. concentrated nitric acid and 50 cc. water. The final product was a platinum cathode having a black, tenaciously adherent coating.

Example 6

A plating procedure similar to that described in Example 1 was followed using a plating bath consisting essentially of 300 g./l. sodium iodide, 3.0 g./l. zinc sulfate, and 5.0 g./l. chloroplatinic acid. Plating was conducted at a current density of 20 ma./cm.$^2$ and a temperature of approximately 38° C. A concentrated HCl etchant was employed. The final product was a platinum cathode having a black, tenaciously adherent coating.

It is appreciated that while certain preferred forms of the invention have been specifically disclosed, numerous additional forms of the invention will readily be apparent to those skilled in the art. It is accordingly intended that the invention be defined by the following claims.

What we claim as new and desire to secure by Letters Patent of the United States is:

1. A process of producing a platinum metal electrode comprising,
    forming an aqueous plating bath containing a platinum metal in a concentration of from 3 to 20 grams per liter, concentrated hydrochloric acid in a proportion of from 0 to 100 milliliters per liter, a selected base metal in an amount sufficient to form a weight ratio of the platinum metal to the selected base metal of from 1:1 to 10:1, and a dissolved quantity of a salt selectede from the group consisting of lithium, sodium, and alkaline earth metal halides sufficient to completely solubilize the selected base metal,
    immersing an anode and a cathode in the plating bath,
    maintaining a plating bath temperature of from 30° C. to 100° C. and a cathode current density of from 5 to 50 milliamperes per square centimeter,
    removing the cathode from the plating bath,
    rinsing the cathode in a solution consisting essentially of water and a salt chosen from the class consisting of lithium, sodium, and alkaline earth metal halides, rinsing the cathode in water, and
    selecting etching the selected base metal from the platinum metal deposited on the cathode.

2. A process according to claim 1 wherein the hydrochloric acid is present in the plating bath in a concentration from 20 to 60 milliliters per liter.

3. A process according to claim 1 wherein the ratio of platinum metal to selected base metal ranges from 2:1 to 7.5:1.

4. A process according to claim 1 wherein the cathode current density ranges from 15 to 45 milliamperes per square centimeter.

5. A process according to claim 1 wherein the platinum metal is present in the plating bath in the form of chloroplatinic acid.

6. A process according to claim 1 wherein the platinum metal is present in the plating bath in the form of palladium chloride.

7. A process according to claim 1 wherein the selected base metal is silver.

8. A process according to claim 1 wherein the selected base metal is copper.

9. A process according to claim 1 wherein the selected base metal is nickel.

10. A process according to claim 1 wherein the selected base metal is zinc.

11. A process of producing a platinum metal electrode comprising,
    forming an aqueous plating bath containing platinum metal ions in a concentration of from 3 to 20 grams per liter, concentrated hydrochloric acid in a proportion of from 0 to 100 milliliters per liter, a selected base metal salt chosen from the class consisting of selected base metal halides and sulfates in an amount sufficient to form a weight ratio of the platinum metal to the selected base metal of from 1:1 to 10:1, and a dissolved quantity of a salt selected from the group consisting of lithium, sodium, and alkaline earth metal halides sufficient to completely solubilize the selected base metal,
    immersing an anode and a cathode in the plating bath,
    maintaining a plating bath temperature of from 30 to 100° C. and a cathode current density of from 5 to 50 milliamperes per square centimeter,
    removing the cathode from the plating bath,
    rinsing the cathode in a solution consisting essentially of water and a salt chosen from the class consisting of lithium, sodium, and alkaline earth metal halides, rinsing the cathode in water, and
    selectively etching the selected base metal from the platinum metal deposited on the cathode.

12. A process according to claim 11 wherein the hydrochloric acid is present in the plating bath in a concentration from 20 to 60 milliliters per liter.

13. A process according to claim 11 wherein the ratio of platinum metal to selected base metal ranges from 2:1 to 7.5:1.

14. A process according to claim 11 wherein the cathode current density ranges from 15 to 45 milliamperes per square centimeter.

15. A process according to claim 11 wherein the platinum metal is present in the plating bath in the form of chloroplatinic acid.

16. A process according to claim 11 wherein the platinum metal is present in the plating bath in the form of palladium chloride.

17. A process according to claim 11 wherein the selected base metal is silver.

18. A process according to claim 11 wherein the seleceted base metal is copper.

19. A process according to claim 11 wherein the selected base metal is nickel.

20. A process according to claim 11 wherein the selected base metal is zinc.

References Cited

UNITED STATES PATENTS

| | | | |
|---|---|---|---|
| 2,737,541 | 3/1956 | Coolidge | 204—20 |
| 3,097,149 | 7/1963 | Lacroix | 204—24 |
| 3,272,728 | 9/1966 | Hahndorff | 204—35 |
| 3,287,169 | 11/1966 | Rogers | 204—11 |

JOHN H. MACK, *Primary Examiner.*

T. TUFARIELLO, *Assistant Examiner.*